United States Patent
Ohashi et al.

(10) Patent No.: US 6,507,464 B1
(45) Date of Patent: Jan. 14, 2003

(54) CO-FE-NI MAGNETIC FILM HAVING A HIGH SATURATION MAGNETIC FLUX DENSITY, COMPOSITE THIN FILM MAGNETIC HEAD USING THE FILM AND MAGNETIC MEMORY DEVICE USING THE HEAD

(75) Inventors: Keishi Ohashi, Tokyo (JP); Mikiko Saito, Tokyo (JP); Tamaki Toba, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/566,576

(22) Filed: May 8, 2000

(30) Foreign Application Priority Data

May 10, 1999 (JP) .......................... 11-128152

(51) Int. Cl.[7] ............................................. G11B 5/127
(52) U.S. Cl. ...................................................... 360/317
(58) Field of Search ............................. 360/317, 324.1, 360/324.11, 324.12, 323

(56) References Cited

U.S. PATENT DOCUMENTS 5,549,978 A * 8/1996 Iwasaki et al. .......... 360/324.1
5,652,054 A * 7/1997 Kikitsu et al. ............... 360/323
5,688,605 A * 11/1997 Iwasaki et al. .......... 360/324.1
5,698,335 A * 12/1997 Iwasaki et al. .......... 360/324.1
5,702,832 A * 12/1997 Iwasaki et al. .......... 360/324.1
5,725,963 A * 3/1998 Iwasaki et al. ......... 360/324.12
5,738,946 A * 4/1998 Iwasaki et al. .......... 360/324.1
5,780,176 A * 7/1998 Iwasaki et al. ......... 360/324.11

FOREIGN PATENT DOCUMENTS

| JP | 5-263170 | 10/1993 |
| JP | 8-241503 | 9/1996 |
| JP | 8-321010 | 12/1996 |
| JP | 11-74122 | 3/1999 |

* cited by examiner

Primary Examiner—Allen Cao
(74) Attorney, Agent, or Firm—Hayes Soloway PC

(57) ABSTRACT

A Co—Fe—Ni magnetic film has a composition represented by a chemical formula of $Co_xFe_yNi_z$ ($50 \leq x \leq 80$, $20 \leq y \leq 40$, and $3 \leq z < 10$ (wt %)) and has an average grain size not greater than 40 nm. The Co—Fe—Ni magnetic film is prepared by electroplating. A magnetic head comprises the magnetic film as a magnetic pole layer. A magnetic memory device comprises a combination of the magnetic head and a magnetic recording medium having a high coercive force between 3500 and 7000 Oe, both inclusive.

21 Claims, 4 Drawing Sheets

CO-FE-NI MAGNETIC FILM HAVING A HIGH SATURATION MAGNETIC FLUX DENSITY, COMPOSITE THIN FILM MAGNETIC HEAD USING THE FILM AND MAGNETIC MEMORY DEVICE USING THE HEAD

BACKGROUND OF THE INVENTION

This invention relates to a magnetic pole material for a magnetic head, a composite thin film magnetic head using the same, and a magnetic memory device comprising the composite thin film magnetic head.

In order to realize high-density recording, a magnetic head mounted on a magnetic memory device is required to generate a recording magnetic field more and more increased in magnetic field strength.

In recent magnetic memories such as a magnetic disk unit, a composite thin film magnetic head is predominantly used as a recording/reproducing device. The composite thin film magnetic head comprises a magnetoresistive head and an inductive head as a reproducing head and a recording head, respectively. By individually optimizing the reproducing head and the recording head, the magnetic memory device can further be improved in performance.

In order to increase the magnetic field strength of the recording magnetic field, it is necessary to use a magnetic pole material having a high saturation flux density as a magnetic pole layer of the inductive head. Furthermore, it is essential that the magnetic pole material is easily magnetized under a magnetic field generated by a coil. Therefore, the magnetic pole material must be a magnetic material small in coercive force and high in permeability, i.e., an excellent soft magnetic material.

As the magnetic pole material of the inductive head, use has widely been made of a Ni—Fe alloy (permalloy) produced by electroplating.

In the above-mentioned composite thin film magnetic head, use is often made of a permalloy which has a composition range such that the content of Ni is on the order of 81–82 wt % and which has a magnetostrictive constant approximately equal to zero. The permalloy having the above-mentioned composition range will hereinafter be referred to as a 82 permalloy. The 82 permalloy has a saturation flux density between 9000 and 10000 G (gauss). If an excellent soft magnetic material having a higher saturation flux density is used, it is possible to produce a magnetic head having a recording magnetic field great in magnetic field strength and steep in magnetic field gradient.

To this end, proposal has been made of various materials as a soft magnetic material which is for use in a magnetic head and which has a saturation flux density higher than that of the 82 permalloy. In particular, a Co—Fe—Ni magnetic film made of a Co—Fe—Ni ternary alloy is small in coercive force and magnetostrictive constant and has a high saturation flux density not smaller than 14000G. Therefore, extensive consideration has been made of the composition of the Co—Fe—Ni alloy and an additive thereto.

For example, Japanese Unexamined Patent Publication (JP-A) No. H05-263170 discloses a thin film magnetic head using a Co—Fe—Ni film containing 60–90 wt % Co, 3–9 wt % Fe, and 5–15 wt % Ni.

Japanese Unexamined Patent Publication (JP-A) No. H08-241503 discloses a thin film magnetic head using a Co—Fe—Ni film containing 60–80 wt % Co, 8–25 wt % Fe, and 15–25 wt % Ni.

Japanese Unexamined Patent Publication (JP-A) No. H08-321010 discloses a thin film magnetic head using a Co—Fe—Ni film containing 60–75 wt % Co, 3–9 wt % Fe, and 17–25 wt % Ni.

However, each of the above-mentioned Co—Fe—Ni films produced by conventional methods has a saturation flux density on the order between 14000 and 18000 G and does not achieve a saturation flux density of a yet higher level. In addition, because of inclusion of such a large content of Co, each of the Co—Fe—Ni films is inferior in corrosion resistance than a permalloy film. The corrosion resistance is required to assure the reliability of a device such as a magnetic head in which the Co—Fe—Ni film is used.

Japanese Unexamined Patent Publication (JP-A) No. H11-74122 discloses a Co—Fe—Ni film containing 40–70 wt % Co, 20–40 wt % Fe, and 10–20 wt % Ni and a method of producing the same. The Co—Fe—Ni film disclosed in this publication has a high saturation flux density on the order between 19000 and 22000 G and a low coercive force not greater than 2.5 Oe.

However, the increase in magnetic recording density requires a magnetic head having a higher recording ability. Following the recent progress in increase of the magnetic recording density, a minimum magnetic reversal area as a recording unit becomes so small and is therefore susceptible to the influence of thermal energy even at the room temperature. At a recording density exceeding 10 gigabit/in$^2$, recording magnetization becomes unstable due to thermal fluctuation.

In order to minimize the thermal fluctuation, it is most effective to enhance anisotropy energy of a magnetic layer of a magnetic recording medium so as to stabilize the recording magnetization against the thermal fluctuation. However, such enhancement of the anisotropy energy is equivalent to an increase in strength of a magnetic field required to reverse the magnetization, i.e., an increase in coercive force of the magnetic recording medium. In order to write data into the magnetic recording medium having a large coercive force, it is necessary to increase the strength of a recording magnetic field of the magnetic head. Therefore, a magnetic material having a high saturation flux density and capable of generating a stronger recording magnetic field is required to meet further increase in magnetic recording density.

SUMMARY OF THE INVENTION

It is an object of this invention to provide a soft magnetic film small in coercive force and magnetostrictive constant and having a high saturation flux density on the order between 20000 and 23000 G.

It is a specific object of this invention to provide a magnetic material having a less Ni content to achieve a greater saturation flux density with a coercive force and a magnetostrictive constant kept sufficiently small.

It is another object of this invention to provide a magnetic head comprising the above-mentioned magnetic film.

It is still another object of this invention to provide a magnetic memory device capable of suppressing thermal fluctuation even at a high recording density by combining the above-mentioned magnetic head and a recording medium having a large coercive force.

According to this invention, there is provided a $Co_xFe_yNi_z$ magnetic film having a composition represented by a chemical formula of $Co_xFe_yNi_z$ ($50 \leq x \leq 80$, $20 \leq y \leq 40$, and $3 \leq z < 10$ (wt %)) and having an average grain size not greater than 40 nm.

The above-mentioned magnetic film contains a large amount of Co. However, it is possible to improve an corrosion resistance of the film if the content of S (sulfur) as an impurity contained in the film is not greater than 0.1 wt %.

According to this invention, there is also provided a composite thin film magnetic head comprising a reproducing head and an inductive head. The inductive head has a magnetic pole layer a whole or a part of which comprises the above-mentioned Co—Fe—Ni magnetic film. In this case, the Co—Fe—Ni magnetic film preferably has a thickness between 0.3 and 2.0 µm (both inclusive).

According to this invention, there is also provided a magnetic memory device comprising a combination of the above-mentioned composite thin film magnetic head and a magnetic recording medium. In this case, the magnetic recording medium preferably has a coercive force not smaller than 3500 Oe. If the magnetic recording medium has a greater coercive force not smaller than 5000 Oe and a yet greater coercive force not smaller than 7000 Oe, the magnetic memory device is less susceptible to the influence of thermal fluctuation even upon high-density recording.

DESCRIPTION OF THE PREFERRED EMBODIMENTS

Figure 1:
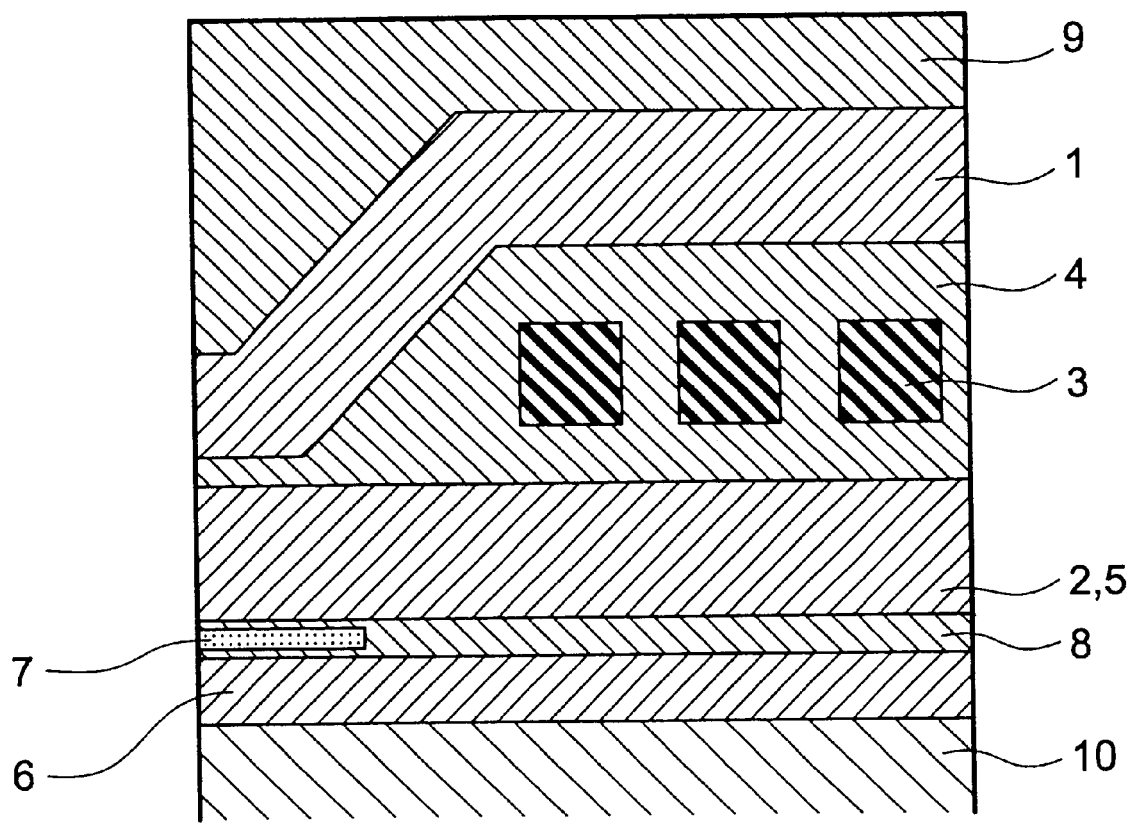
FIG. 1 is a sectional view of a characteristic part of a composite thin film magnetic head according to a first embodiment of this invention.

Now, description will be made of a few preferred embodiments of this invention with reference to the drawing.

At first referring to FIG. 1, a composite thin film magnetic head according to a first embodiment of this invention comprises an inductive head having a recording function and a magnetoresistive head having a reproducing function. The inductive head comprises a lower magnetic pole layer 2, an insulating layer 4 formed thereon to serve as a recording gap and having a patterned portion with a copper coil 3 embedded therein, and an upper magnetic pole layer 1 deposited thereon. The magnetoresistive head comprises a lower shielding layer 6, an insulating layer 8 formed thereon, a magnetoresistive element 7 sandwiched in the insulating layer 8, and an upper shielding layer 5 deposited on the insulating layer 8. In the first embodiment, a single common layer is used as both the lower magnetic pole layer 2 and the upper shielding layer 5. Each of the upper magnetic pole layer 1 and the lower magnetic pole layer 2 of the inductive head comprises a Co—Fe—Ni magnetic thin film. The Co—Fe—Ni magnetic thin film is formed by electroplating which will later be described and has soft magnetic characteristics such as a high saturation flux density between 20000 and 23000 G and a low coercive force not greater than 5 Oe. The lower shielding layer 6 is formed on an alumina film 10 deposited on a ceramic substrate (not shown). On the upper magnetic pole layer 1, an insulating film 9 is deposited.

In the above-mentioned inductive head, the insulating layer 4 (recording gap) is interposed between the upper magnetic pole layer 1 and the lower magnetic pole layer 2 to form a ring-shaped magnetic core. The ring-shaped magnetic core is excited by a recording current flowing through the coil 3 to generate a recording magnetic field leaking from the recording gap. Under the recording magnetic field, a writing operation into the magnetic recording medium is carried out.

Each of the upper and the lower magnetic pole layers 1 and 2 preferably has a thickness not greater than 5 µm so as to avoid the decrease in high-frequency permeability due to an eddy current. In case of recording at a frequency not lower than 100 MHz, it is preferred that the thickness is not greater than 3 µm.

As compared with a conventional head, the composite thin film magnetic head of the above-mentioned structure has a high writing or recording ability under the effect of the Co—Fe—Ni magnetic thin films as the upper and the lower magnetic pole layers 1 and 2. By the use of the Co—Fe—Ni magnetic film, a magnetic field increased in magnetic field strength and in magnetic field gradient can be produced without excessive magnetic saturation of the magnetic pole layer. Therefore, it is possible to write a low-noise high-resolution magnetic recording pattern to a magnetic recording medium having a large coercive force.

Figure 4:
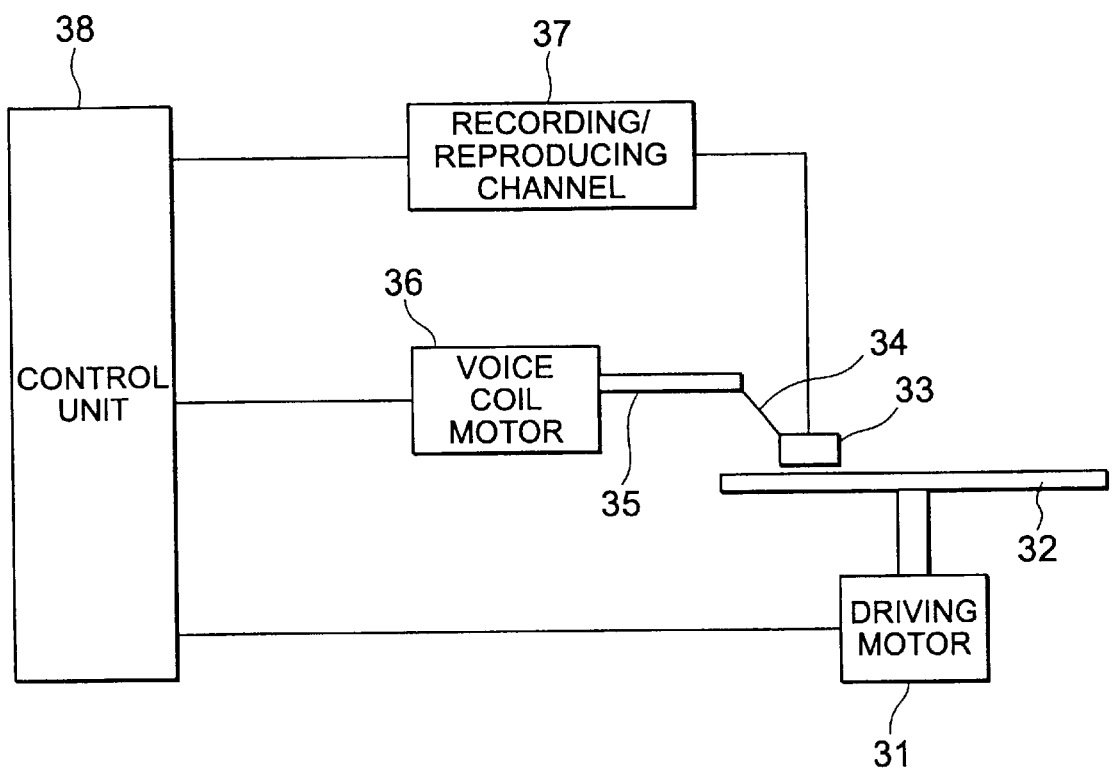
FIG. 4 is a schematic view showing the structure of a magnetic memory device according to this invention.

Referring to FIG. 4, a magnetic memory device comprises a combination of the composite thin film magnetic head according to this invention and the magnetic recording medium having a large coercive force. The composite thin film magnetic head is mounted on a magnetic head slider 33 and coupled through a suspension 34 and an arm 35 to a voice coil motor 36. The voice coil motor 36 serves to control the position of the magnetic head, i.e., carries out a tracking operation. The magnetic recording medium 32 is arranged opposite to the magnetic head slider 33 and rotated by a driving motor 31. The composite thin film magnetic head carries out recording and reproducing operations in response to a signal from a recording/reproducing channel 37 which is controlled by a control unit 38. Likewise, the voice coil motor 36 and the driving motor 31 are controlled by the control unit 38. In the magnetic memory device of the above-mentioned structure, the recording and the reproducing operations were carried out by the use of the magnetic recording medium 32 having a coercive force of 7000 Oe. As a result, magnetic recording was carried out at a high recording density of 40 gigabit/in$^2$ or more and in a stable condition hardly affected by thermal fluctuation.

Figure 2:
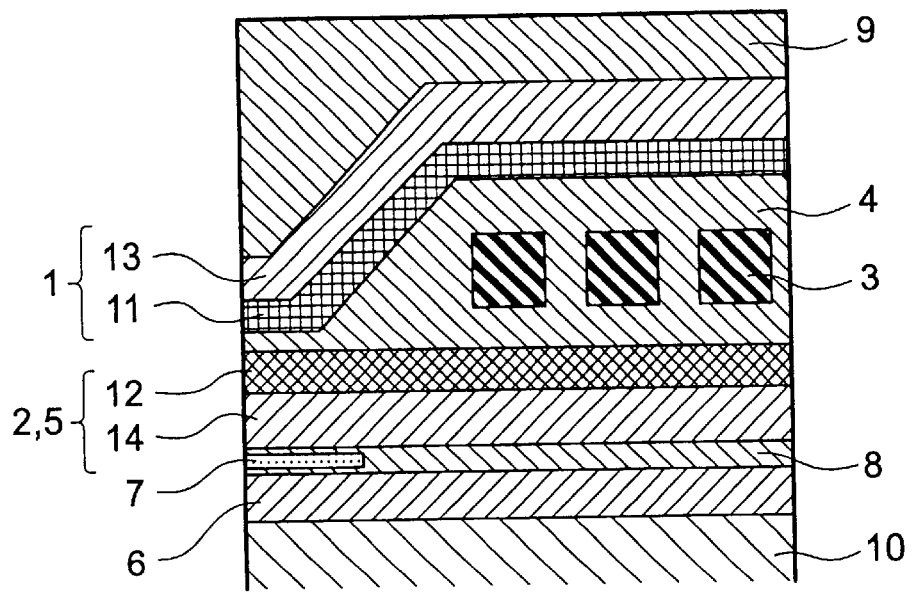
FIG. 2 is a sectional view of a characteristic part of a composite thin film magnetic head according to a second embodiment of this invention.

Referring to FIG. 2, a composite thin film magnetic head according to a second embodiment of this invention is similar in structure to the first embodiment except that each of the upper and the lower magnetic pole layers 1 and 2 is divided into two parts. Specifically, one part of the upper magnetic pole layer 1 adjacent to the insulating layer 4 comprises a Co—Fe—Ni magnetic film 11 of this invention. Likewise, one part of the lower magnetic pole layer 2 adjacent to the insulating layer 4 comprises a Co—Fe—Ni magnetic film 12 of this invention.

The writing ability can be improved if each of the Co—Fe—Ni magnetic films 11 and 12 is as thin as 0.1 µm.

However, the thickness not smaller than 0.3 μm is preferable in order to fully exhibit the above-mentioned effect. The thickness not smaller than 0.5 μm is more preferable in order to remarkably exhibit the above-mentioned effect. On the other hand, if the thickness is greater than 2 μm, the recording ability is degraded because the Co—Fe—Ni magnetic film has a relative permeability as low as 300–800 (DC). Therefore, it is preferable that the thickness is not greater than 2 μm.

The other part of the upper magnetic pole layer 1 comprises an auxiliary magnetic film 13. Likewise, the other part of the lower magnetic pole layer 2 comprises an auxiliary magnetic film 14. Each of the auxiliary magnetic films 13 and 14 may be made of a soft magnetic material such as permalloy, sendust (Fe—Al—Si alloy), and an amorphous Co alloy. Preferably, each of the auxiliary magnetic films 13 and 14 has a thickness on the order between 2 and 5 μm.

In order to further improve the recording/reproducing functions, the single common layer (which will hereafter be referred to as a common shield) serving as both the magnetic pole layer (lower magnetic pole layer 2) and the shielding layer (upper shielding layer 5) is preferably made of a soft magnetic material having a magnetostrictive constant approximate to zero as nearly as possible. This is because, if the common shield is made of a material having a large magnetostrictive constant, the influence of the recording operation also affects the reproducing operation to result in frequent occurrence of variation in reproduction waveform. In view of the above, the auxiliary magnetic film 14 of the common shield except the Co—Fe—Ni magnetic film 12 is preferably made of a material having a small magnetostrictive constant, for example, a 82 permalloy having a magnetostrictive constant on the order of $10^{-7}$.

Figure 5:
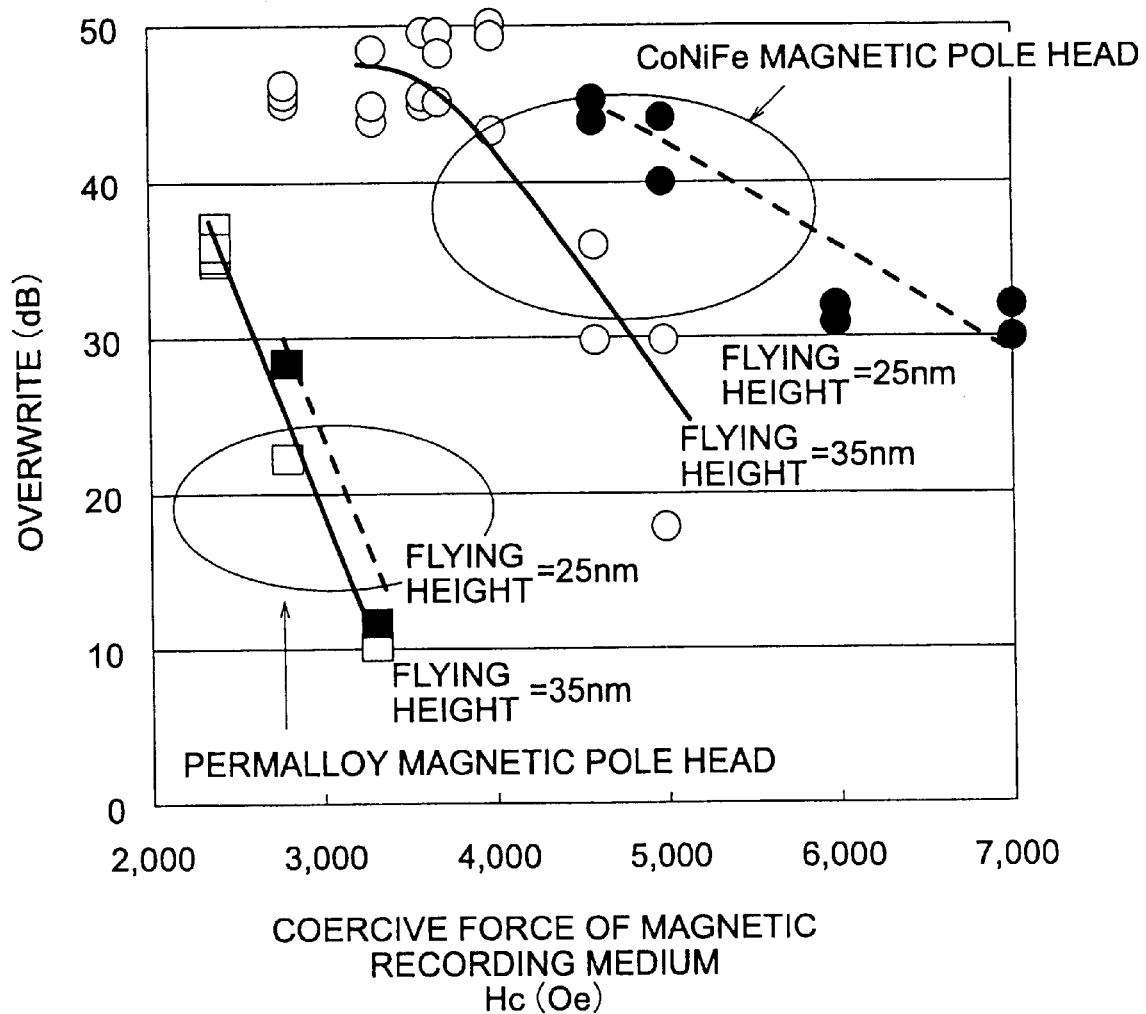
FIG. 5 is a view showing overwrite characteristics of the composite thin film magnetic head according to this invention in comparison with a conventional composite thin film magnetic head.

The composite thin film magnetic head of the above-mentioned structure was incorporated into the magnetic memory device illustrated in FIG. 4. By the use of various magnetic recording media different in coercive force as the magnetic recording medium 32, measurement was made of overwrite (O/W) characteristics. The result of measurement is shown in FIG. 5. The measurement was carried out with a magnetic spacing kept at 48 nm (flying height of 25 nm) and 58 nm (flying height of 35 nm) and at a frequency between 50 and 60 MHz. For the purpose of comparison, preparation was made of a conventional head (permalloy magnetic pole head labelled in the figure) similar in structure to the composite thin film magnetic head except that the upper and the lower magnetic pole layers 1 and 2 are entirely made of the 82 permalloy. The conventional head was similarly evaluated for the O/W characteristics which are also shown in the figure.

As seen from FIG. 5, the composite thin film magnetic head (CoNiFe magnetic pole head labelled in the figure) using the Co—Fe—Ni magnetic film of this invention could write a low-noise high-resolution magnetic recording pattern (S/N>30 dB) when the magnetic recording medium has a large coercive force between 3000 and 7000 Oe. At a high recording density of 20 gigabit/$in^2$ or more (40 gigabit/$in^2$ for the magnetic recording medium of 7000 Oe), magnetic recording was hardly affected by the thermal fluctuation and was therefore stable. On the other hand, the conventional composite thin film magnetic head could not perform such excellent recording/reproducing operations (S/N<30 dB) even when the magnetic recording medium has a coercive force of 3000 Oe. Furthermore, writing was impossible for the magnetic recording medium having a coercive force of 3500 Oe or more.

The above-mentioned measurement was performed at the magnetic spacings of 48 nm and 58 nm. By further reducing the magnetic spacing, it is possible to enhance the recording magnetic field applied by the recording head upon the magnetic recording medium. Therefore, recording into the magnetic recording medium having a high coercive force of 7000 Oe or more would be possible by the use of the composite thin film magnetic head of this invention if the magnetic spacing is further reduced. On the other hand, in the conventional composite thin film magnetic head, recording into the magnetic recording medium having a coercive force of 3500 Oe or more was impossible even if the flying height was further reduced to 17 nm.

Figure 3:
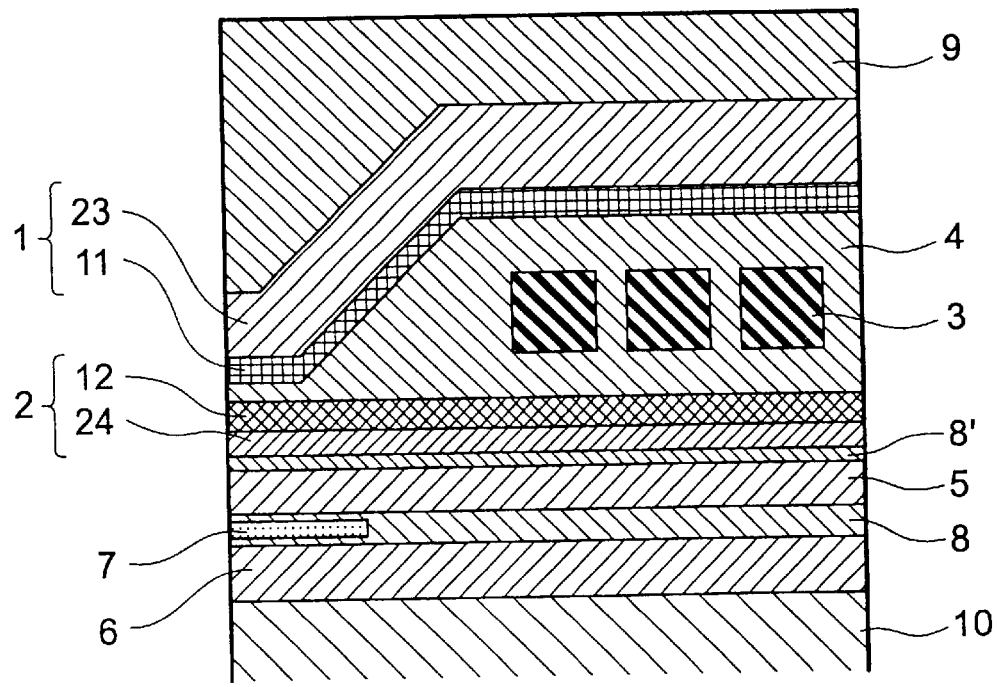
FIG. 3 is a sectional view of a characteristic part of a composite thin film magnetic head according to a third embodiment of this invention.

Referring to FIG. 3, a composite thin film magnetic head according to a third embodiment of this invention is similar in structure, to the second embodiment in that a part of the upper magnetic pole layer 1 adjacent to the insulating layer 4 as a recording gap comprises the Co—Fe—Ni magnetic film 11 and that a part of the lower magnetic pole layer 2 adjacent to the insulating layer 4 comprises the Co—Fe—Ni magnetic film 12. A remaining part of the upper magnetic pole layer 1 except the Co—Fe—Ni magnetic film 11 comprises an auxiliary film 23. Likewise, a remaining part of the lower magnetic pole layer 2 except the Co—Fe—Ni magnetic film 12 comprises an auxiliary film 24. In this embodiment, however, the lower magnetic pole layer 2 and the upper shielding layer 5 are not common but are different or independent from each other. Between the lower magnetic pole layer 2 and the upper shielding layer 5, an insulating film 8' is formed. Thus, the structure of the third embodiment is not of a common shield type. Therefore, it is possible to suppress the influence of material characteristics of the lower magnetic pole layer 2 upon the reproducing function and to suppress the influence of the recording operation upon the reproduction waveform obtained in the subsequent reproducing operation. Such influence is frequently observed in the structure of a common shield type. Therefore, the magnetic pole layer may be made of a material having a relatively large magnetostrictive constant. For example, use may be made of a soft magnetic film such as permalloy, sendust (Fe—Al—Si alloy), and an amorphous Co alloy. Particularly, use is advantageously made of a Ni—Fe film made of a Ni—Fe alloy containing 40–55 wt % Ni (hereinafter referred to as 45 permalloy), a soft magnetic film made of 45 permalloy with a small amount of other elements such as Co added thereto to improve the characteristics, and the like. Although the magnetostrictive constant is as large as on the order of $10^{-5}$, the 45 permalloy is a soft magnetic material having a relatively large saturation flux density of about 15000 G. Therefore, each of the auxiliary films 23 and 24 of the upper and the lower magnetic pole layers 1 and 2 is made of a material, such as a 45 permalloy, having a high saturation flux density. With this structure, the composite thin film magnetic head can produce a stronger recording magnetic field.

The composite thin film magnetic head of the above-mentioned structure was incorporated into the magnetic memory device illustrated in FIG. 4. Recording/reproducing operations were carried out by the use of various magnetic recording media having different coercive forces between 2000 and 7000 Oe as the magnetic recording medium 32. In the magnetic memory device of this invention, high-density recording was possible at 30 gigabit/$in^2$ by the use of the recording medium having a coercive force of 5000 Oe or more and at 40 gigabit/$in^2$ by the use of the recording medium having a coercive force of 7000 Oe or more. In addition, magnetic recording was hardly affected by the thermal fluctuation and was therefore stable.

In the composite thin film magnetic head of a common shield type according to the second embodiment, the auxiliary film 13 of the upper magnetic pole layer 1 may be made of a material, such as a 45 permalloy, having a high saturation flux density. With this structure, the composite thin film magnetic head can generate a strong recording magnetic field as compared with the use of a 82 permalloy.

Now, a method (electroplating) of producing the Co—Fe—Ni magnetic thin film according to this invention will be described in detail. Table 1 shows the composition of an electroplating bath in this invention. Table 2 shows the condition of the electroplating.

TABLE 1

Composition of Plating Bath

| Component | Content (g/l) |
| --- | --- |
| cobalt sulfate (heptahydrate) | 8.4–56.2 |
| nickel sulfate (hexahydrate) | 26.3–79.2 |
| iron (II) sulfate (heptahydrate) | 4.5 |
| boric acid | 15.0 |
| sodium dodecyl sulfate | 0.01 |

TABLE 2

Condition of Electroplating

| Item | Condition |
| --- | --- |
| Plating Temperature | 20–60° C. |
| Current Density | 6.0–20.0 mA/cm$^2$ |
| pH | 2.5–3.5 |
| Agitation | paddle agitation |

The $Co_xFe_yNi_z$ magnetic film ($50 \leq x \leq 80$, $20 \leq y \leq 40$, and $3 \leq z < 10$ (wt %)) prepared by the use of the plating bath in Table 1 and under the plating condition in Table 2 was an excellent soft magnetic film having a coercive force not greater than 5 Oe and a high saturation flux density between 20000 and 23000 G. Generally, a Co—Fe—Ni ternary alloy less contributes to a magnetic moment of Ni than to that of Fe or Co. Therefore, if the content of Ni is less than 3 wt %, the coercive force exceeds 5 Oe and the hysteresis is also increased. This results in decrease in permeability of the film. Accordingly, in order to achieve excellent soft magnetic characteristics such as a low coercive force and a high saturation flux density, the content of Ni must be equal to 3 wt % or more. Among the Co—Fe—Ni magnetic films within the above-mentioned composition range, soft magnetic films having a low coercive force of 5 Oe or less had an average grain size not greater than 40 nm.

The Co—Fe—Ni magnetic film prepared under the above-mentioned condition and in the above-mentioned composition range had magnetic characteristics shown in Table 3.

TABLE 3

Composition of Co—Fe—Ni Magnetic Film and Magnetic Characteristics

| Sample No. | #1 | #2 | #3 | #4 | #5 |
| --- | --- | --- | --- | --- | --- |
| Co (wt %) | 70 | 51 | 64 | 77 | 57 |
| Fe (wt %) | 21 | 40 | 30 | 20 | 40 |
| Ni (wt %) | 9 | 9 | 6 | 3 | 3 |
| Saturation Flux Density (kG) | 20 | 20 | 21 | 21 | 23 |
| Coercive Force (Oe) | 1–3 | 3–7 | 3–5 | 4–7 | 4–10 |
| Magnetostrictive Constant ($\times 10^{-6}$) | 1–3 | 8–16 | 4–9 | 1–4 | 9–25 |

In order to achieve an excellent soft magnetic film within the composition range of this invention, it is important not to add sodium saccharin which is traditionally used as a stress relaxation agent to reduce internal stress of an electroplating film. In case where sodium saccharin is added, a bcc phase tends to appear and the grain size is not smaller than 40 nm. This results in a large coercive force of 20 Oe or more. Furthermore, the magnetostrictive constant becomes great throughout the composition range and the corrosion resistance is degraded. Therefore, in the method of this invention, it is important not to use an additive, such as sodium saccharin, containing sulfur. Through examination of compositions of the Co—Fe—Ni magnetic film thus prepared, it has been revealed that the soft magnetic film excellent in corrosion resistance and soft magnetic characteristic is obtained as far as the content of sulfur is not greater than 0.1 wt %.

In the composition range of the Co—Fe—Ni magnetic film according to this invention, the contents of Fe and Co have a large influence upon the coercive force.

At first, if the content of Fe is greater than 40 wt % or if the content of Co is smaller than 50 wt %, it is extremely difficult to achieve the coercive force not greater than 5 Oe. Presumably, such composition dependency of the coercive force results from two reasons. First, even if no sodium saccharin is added to the plating bath, the bcc phase tends to appear and the grain size becomes large in case where the content of Fe is greater than the composition range of this invention. Second, if the content of Fe exceeds 40 wt %, it is extremely difficult to suppress the magnetostrictive constant to a level not greater than $10^{-6}$, even if no sodium saccharin is added to the plating bath.

Next, if the content of Fe is smaller than 20 wt % or if the content of Co is greater than 80 wt %, the coercive force not greater than 5 Oe is difficult to obtain. This is because, if the content of Co exceeds the composition range of this invention, the grain size is not smaller than 40 nm.

As will be understood from Table 3, the saturation flux density increases as the content of Ni becomes small. However, if the content of Ni is smaller than 3 wt %, the coercive force not greater than 5 Oe is difficult to obtain. In addition, the film becomes opaque and loses the glossy appearance. Presumably, this is because the surface of the film becomes rough. In addition, it is believed that Ni serves to decrease the coercive force by reducing the crystal anisotropy energy of the Co—Fe alloy.

Within the composition range of the Co—Fe—Ni magnetic film of this invention, the soft magnetic characteristics are affected by the plating conditions such as the plating current density, pH (concentration of hydrogen ions) of the plating bath, a plating bath agitation rate, and so on.

In order to achieve a low coercive force not greater than 5 Oe in a film composition having a low content of Ni, it is required that the plating current density is not less than 5 mA/cm$^2$, preferably, not less than 15 mA/cm$^2$. In addition, it is required that the pH is not higher than 3.5. If the pH is higher than 3.5, the coercive force may exceed 5 Oe even within the composition range of this invention.

In the Co—Fe—Ni magnetic film of this invention, a small amount of at least one element can be added as far as the magnetic characteristics are not substantially changed. It will readily be understood that, also in this case, the similar effect is achieved. However, it is to be noted that eutectoid reaction was impossible between any element in the first through the third, the seventeenth, and the eighteenth groups of the periodic table and any one of silicon (Si), mercury (Hg), hafnium (Hf), and tantalum (Ta).

In the composite thin film head of this invention, use may be made of a MR (magnetoresistive) element utilizing the magnetoresistance effect and having a reproducing function, a spin valve element utilizing the giant magnetoresistance effect, or a tunnel magnetoresistive element utilizing the spin tunnel junction.

According to this invention, it is possible to produce as a soft magnetic film a $Co_xFe_yNi_z$ magnetic film ($50 \leq x \leq 80$, $20 \leq y \leq 40$, and $3 \leq z < 10$ (wt %)) having an average grain size of 40 nm or less. The magnetic film has soft magnetic characteristics such as a low coercive force of 5 Oe or less and a high saturation flux density between 20000 and 23000 G and is excellent in corrosion resistance. Therefore, in the composite thin film magnetic head using the above-mentioned magnetic film as a magnetic pole layer of the inductive head, the magnetic field strength and the magnetic field gradient of the magnetic field generated by the composite thin film magnetic head can be increased as compared with the conventional head. In the magnetic memory device comprising a combination of the composite thin film magnetic head and the magnetic recording medium having a high coercive force preferably not smaller than 3500 Oe, more preferably not smaller than 7000 Oe, high-density recording can be carried out in a stable condition with thermal fluctuation well suppressed.

What is claimed is:

1. An inductive head for carrying out a recording operation under a magnetic field generated by a magnetic pole layer, wherein at least a part of said magnetic pole layer comprises a Co—Fe—Ni magnetic film which has a composition weight percent (wt %) represented by a chemical formula of $Co_xFe_yNi_z$ ($50 \leq x \leq 80$, $20 \leq y \leq 40$, and $3 \leq z < 10$) and which has an average grain size >0 and <40 nm.

2. An inductive head as claimed in claim 1, wherein said Co—Fe—Ni magnetic film comprises S as an impurity, a composition weight percent (wt %) of S being >0 and <0.1 wt %.

3. An inductive head as claimed in claim 1 wherein said Co—Fe—Ni magnetic film has a saturation flux density between 20000 and 23000 G (both inclusive) and a coercive force >0 and <5 Oe.

4. A composite thin film magnetic head composed of a reproducing head having a magnetoresistive element for detecting a signal flux from a magnetic recording medium as a change in electric resistance, and an inductive head for carrying out a recording operation under a magnetic field generated by a magnetic pole layer, wherein at least a part of said magnetic pole layer comprises a Co—Fe—Ni magnetic film which has a composition weight percent (wt %) represented by a chemical formula of $Co_xFe_yNi_z$ ($50 \leq x \leq 80$, $20 \leq y \leq 40$, and $3 \leq z < 10$) and which has an average grain size >0 and <40 nm.

5. A composite thin film magnetic head as claimed in claim 4, wherein said Co—Fe—Ni magnetic film has a thickness between 0.3 and 2.0 $\mu$m (both inclusive).

6. A magnetic memory device comprising a composite thin film magnetic head claimed in claim 4 and a magnetic recording medium having a coercive force 3500 and oersted (Oe).

7. A magnetic memory device comprising a composite thin film magnetic head claimed in claim 4 and a magnetic recording medium having a coercive force between 3500 and 7000 oersted (Oe), both inclusive.

8. A composite thin film magnetic head composed of a magnetoresistive head comprising a lower shielding layer, an insulating layer deposited on said lower shielding layer with a magnetoresistive element embedded therein, and an upper shielding layer deposited on said insulating layer, and an inductive head arranged adjacent to said magnetoresistive head and comprising a lower magnetic pole layer, an insulating layer deposited on said lower magnetic pole layer with a coil embedded therein, and an upper magnetic pole layer deposited on said insulating layer, wherein at least a part of each of said upper and said lower magnetic pole layers comprises a Co—Fe—Ni magnetic film which has a composition weight percent (wt %) represented by a chemical formula of $Co_xFe_yNi_z$ ($50 \leq x \leq 80$, $20 \leq y \leq 40$, and $3 \leq z < 10$) and which has an average grain size >0 and <40 nm.

9. A composite thin film magnetic head as claimed in claim 8, wherein said Co—Fe—Ni magnetic film has a thickness between 0.3 and 2.0 $\mu$m (both inclusive).

10. A composite thin film magnetic head as claimed in claim 8, wherein a single common layer is used as both of one of said shielding layers and one of said magnetic pole layers.

11. A magnetic memory device comprising a composite thin film magnetic head claimed in claim 8 and a magnetic recording medium having a coercive force 3500 and oersted (Oe).

12. A magnetic memory device comprising a composite thin film magnetic head claimed in claim 8 and a magnetic recording medium having a coercive force between 3500 and 7000 oersted (Oe), both inclusive.

13. A composite thin film magnetic head composed of a magnetoresistive head comprising a lower shielding layer, an insulating layer deposited on said lower shielding layer with a magnetoresistive element embedded therein, and an upper shielding layer deposited on said insulating layer, and an inductive head arranged adjacent to said magnetoresistive head and comprising a lower magnetic pole layer, an insulating layer deposited on said lower magnetic pole layer with a coil embedded therein, and an upper magnetic pole layer deposited on said insulating layer, wherein a part of each of said magnetic pole layers comprises a Co—Fe—Ni magnetic film which has a composition weight percent (wt %) represented by a chemical formula of $Co_xFe_yNi_z$ ($50 \leq x \leq 80$, $20 \leq y \leq 40$, and $3 \leq z < 10$) and which has an average grain size >0 and <40 mn, the other part of each said magnetic pole layers comprising a Ni—Fe magnetic film.

14. A composite thin film magnetic head as claimed in claim 13, wherein said Ni—Fe magnetic film contains 40–55 wt % Ni and a balance of Fe.

15. A composite thin film magnetic head as claimed in claim 13, wherein said Co—Fe—Ni magnetic film has a thickness between 0.3 and 2.0 $\mu$m (both inclusive).

16. A composite thin film magnetic head as claimed in claim 13, wherein a single common layer is used as both of one of said shielding layers and one of said magnetic pole layers.

17. A magnetic memory device comprising a composite thin film magnetic head claimed in claim 13 and a magnetic recording medium having a coercive force 3500 and oersted (Oe).

18. A magnetic memory device comprising a composite thin film magnetic head claimed in claim 13 and a magnetic recording medium having a coercive force between 3500 and 7000 oersted (Oe), both inclusive.

19. A composite thin film magnetic head composed of a magnetoresistive head comprising a lower shielding layer, an insulating layer deposited on said lower shielding layer with a magnetoresistive element embedded therein, and an upper shielding layer deposited on said insulating layer, and an inductive head arranged adjacent to said magnetoresistive head and comprising a lower magnetic pole layer, an insulating layer deposited on said lower magnetic pole layer with a coil embedded therein, and an upper magnetic pole layer deposited on said insulating layer, wherein said lower magnetic pole layer and said upper shielding layer is formed by a single common layer, each of said upper and said lower magnetic pole layers being divided into one part located at the side near to the other magnetic pole layer and the other part located at the side remote from the other magnetic pole layer, said one part of each of said magnetic pole layers comprising a Co—Fe—Ni magnetic film which has a composition weight percent (wt %) represented by a chemical formula of $Co_xFe_yNi_z$ ($50 \leq x \leq 80$, $20 \leq y \leq 40$, and $3 \leq z < 10$) and which has an average grain size >0 and <40 nm, said Co—Fe—Ni magnetic film having a thickness between 0.3 and 2.0 μm (both inclusive), the other part of at least said upper magnetic pole layer comprising a Ni—Fe magnetic film containing 40–55 wt % Ni and a balance of Fe.

20. A magnetic memory device comprising a composite thin film magnetic head claimed in claim 19 and a magnetic recording medium having a coercive force 3500 and oersted (Oe).

21. A magnetic memory device comprising a composite thin film magnetic head claimed in claim 19 and a magnetic recording medium having a coercive force between 3500 and 7000 oersted (Oe), both inclusive.

* * * * *